US010138865B2

(12) United States Patent
Larsen et al.

(10) Patent No.: US 10,138,865 B2
(45) Date of Patent: Nov. 27, 2018

(54) METHOD FOR MOVING WIND TURBINE COMPONENTS AND TRANSPORT SYSTEM FOR MOVING WIND TURBINE COMPONENTS

(71) Applicant: Vestas Wind Systems A/S, Aarhus N. (DK)

(72) Inventors: Gerner Larsen, Hinnerup (DK); Tobias Lidegaard Rossel, Arhus C (DK); Satish Raja Arigela, Hyderabad (IN)

(73) Assignee: Vestas Wind Systems A/S, Aarhus N. (DK)

( * ) Notice: Subject to any disclaimer, the term of this patent is extended or adjusted under 35 U.S.C. 154(b) by 577 days.

(21) Appl. No.: 14/648,016

(22) PCT Filed: Nov. 28, 2013

(86) PCT No.: PCT/DK2013/050401
§ 371 (c)(1),
(2) Date: May 28, 2015

(87) PCT Pub. No.: WO2014/082643
PCT Pub. Date: Jun. 5, 2014

(65) Prior Publication Data
US 2015/0316024 A1 Nov. 5, 2015

Related U.S. Application Data

(60) Provisional application No. 61/757,736, filed on Jan. 29, 2013.

(30) Foreign Application Priority Data

Nov. 29, 2012 (IN) .......................... 3667/DEL/2012
Jan. 25, 2013 (DK) ................................ 2013 70040

(51) Int. Cl.
F03D 80/50 (2016.01)
F03D 1/00 (2006.01)
(Continued)

(52) U.S. Cl.
CPC ................ *F03D 1/003* (2013.01); *B61B 9/00* (2013.01); *B65G 47/04* (2013.01); *B65G 47/901* (2013.01);
(Continued)

(58) Field of Classification Search
CPC .......... F05B 2230/6102; F05B 2230/61; F05B 2240/916; F05B 2230/70; F05B 2230/80; B66C 23/207
(Continued)

(56) References Cited

U.S. PATENT DOCUMENTS 7,850,418 B2 * 12/2010 Niehues .................. F03D 80/50
415/121.3
8,763,313 B2 * 7/2014 Lyness .................... E04H 12/00
52/192
(Continued)

FOREIGN PATENT DOCUMENTS

CN 201165943 Y 12/2008
CN 201943012 U 8/2011
(Continued)

OTHER PUBLICATIONS

Machine Translation of EP 2386515 from Espacenet, accessed on Dec. 11, 2017. (Year: 2011).*
(Continued)

*Primary Examiner* — Mark C Hageman
(74) *Attorney, Agent, or Firm* — Wood Herron & Evans LLP

(57) ABSTRACT

A method of removing a wind turbine component includes assembling a transport system having a track, one or more
(Continued)

support frames, and a carriage movably coupled to the track, the transport system having a first end positioned inside the tower and a second end positioned outside of the tower such that the track extends through an opening in the tower; raising the wind turbine component off of a platform located within the tower and above the door; moving at least part of the platform to allow the component to pass; lowering the wind turbine component onto the carriage; moving the carriage along the track from inside the tower to outside the tower; and removing the wind turbine component from the carriage. A transport system having a track, one or more support frames, and a carriage is also disclosed.

16 Claims, 11 Drawing Sheets

(51) Int. Cl.
| | |
|---|---|
| *B65G 47/04* | (2006.01) |
| *B65G 47/90* | (2006.01) |
| *B66C 13/18* | (2006.01) |
| *B66C 21/00* | (2006.01) |
| *B61B 9/00* | (2006.01) |
| *F03D 13/40* | (2016.01) |

(52) U.S. Cl.
CPC .............. *B66C 13/18* (2013.01); *B66C 21/00* (2013.01); *F03D 13/40* (2016.05); *F03D 80/50* (2016.05); *B66C 2700/011* (2013.01); *F05B 2230/61* (2013.01); *F05B 2240/916* (2013.01); *Y02E 10/728* (2013.01); *Y02P 70/523* (2015.11)

(58) Field of Classification Search
USPC ........................................ 414/10, 12
See application file for complete search history.

(56) References Cited

U.S. PATENT DOCUMENTS

| | | | |
|---|---|---|---|
| 8,807,923 B2 * | 8/2014 | Olesen ................... | F03D 1/003 415/118 |
| 2010/0135792 A1 | 6/2010 | Niehues | |

FOREIGN PATENT DOCUMENTS

| | | | | |
|---|---|---|---|---|
| DE | 3400156 A1 | 8/1985 | | |
| DK | 200000086 U3 | 5/2000 | | |
| EP | 2060706 A2 | 5/2009 | | |
| EP | 2386515 A1 * | 11/2011 | ............ | B66C 1/105 |
| EP | 2386515 A1 | 11/2011 | | |
| WO | 2012152287 A2 | 11/2012 | | |
| WO | 2013080392 A1 | 6/2013 | | |
| WO | WO-2013080392 A1 * | 6/2013 | ............ | F03D 80/50 |

OTHER PUBLICATIONS

European Patent Office, International Search Report and Written Opinion issued in International Application No. PCT/DK2013/050401 dated Feb. 12, 2014.
Danish Patent and Trademark Office, Search Report issued in Application No. PA 2013 70040 dated Aug. 12, 2013.
"Aluminum-Schnellbau-Portalkrane" (Planeta-Hebetechnik GmbH) 2010 http://www.companydepot.de/media/datasheet/Planeta_Alu-Schnellbau-Portalkrane.pdf.

* cited by examiner

METHOD FOR MOVING WIND TURBINE COMPONENTS AND TRANSPORT SYSTEM FOR MOVING WIND TURBINE COMPONENTS

TECHNICAL FIELD

The invention relates generally to wind turbines, and more particularly, to a transport system for moving wind turbine components into and/or out of a wind turbine tower, and a method of moving wind turbine components into and/or out of a wind turbine tower using such a transport system.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower, a nacelle located at the apex of the tower, and a rotor having a plurality of blades and supported in the nacelle by means of a shaft. The shaft couples the rotor either directly or indirectly with a generator, which is housed inside the nacelle. Consequently, as wind forces the blades to rotate, electrical energy is produced by the generator.

In addition to these components, a wind turbine also includes a number of components for regulating the electrical energy produced by the wind turbine. For example, wind turbines often include a transformer, converter, and other electrical components that regulate the electrical energy so that it may be fed to a power grid in a certain manner. These electrical components can be relatively large, heavy items and are expected to become even larger and heavier as wind turbines and their power production continues to increase. These electrical components are typically located in the nacelle adjacent to, for example, the generator. However, as the size of these components increases and the space within the nacelle becomes more limited, alternative locations for the transformer, converter, and other components have been considered. In some wind turbine designs, for example, these components have been located within the tower, and more specifically, adjacent the base of the tower.

The working life of many of these electrical components is less than the working life of the wind turbine. In this regard, the electrical transformer in the wind turbine may have a working life of about twelve years while the wind turbine itself (e.g., blades, tower, etc.) may be designed for a working life of about twenty years. Accordingly, wind turbine designers and manufacturers have to make allowances for removing and replacing these electrical components during the working life of the wind turbine. However, it can be difficult, time consuming, and expensive to remove and replace these various components. For example, when these components are located in the nacelle, large and expensive cranes are typically used to remove and replace the components. When these components are located adjacent the bottom of the tower, expensive and complex internal crane systems must be included within the tower to allow the components to be moved through the door or hatch way typically located at the base of the tower. In any event, component removal and replacement is not easily achieved. Some wind turbine component replacement solutions are known from DK200000086U3 and EP2247853. However, there is still a desire to provide an improved solution.

There is therefore a need in the wind turbine industry to have a system that facilitates removal and replacement of various wind turbine components during the life of the wind turbine so as to overcome the drawbacks of current systems. There is also a need for an improved method of removing and replacing these wind turbine components.

SUMMARY

A method of removing a wind turbine component from a wind turbine having a tower with a door for closing off an opening through the tower includes assembling a transport system having a track, one or more support frames for supporting the track, and a carriage movably coupled to the track, the transport system having a first end positioned inside the tower and a second end positioned outside of the tower such that the track extends through the opening in the tower; raising the wind turbine component off of a platform located within the tower and above the door; moving at least a part of the platform to allow the wind turbine component to pass the platform; lowering the wind turbine component onto the carriage; moving the carriage along the track from inside the tower to outside the tower such that the wind turbine component is completely positioned outside the tower; and removing the wind turbine component from the carriage.

The method may further include moving another wind turbine component into the wind turbine. This step may include positioning the another wind turbine component on the carriage; moving the carriage along the track from outside the tower to inside the tower; raising the another wind turbine component off of the carriage and above the platform; moving at least a part of the platform to prevent the another wind turbine component from passing the platform; lowering the another wind turbine component onto the platform; and disassembling the transport system.

In one embodiment, assembling the transport system may include positioning a first end of a first rail inside the tower with a second end positioned outside of the tower; positioning a first end of a second rail inside the tower with a second end positioned outside the tower, the second rail being positioned so as to be generally parallel to the first rail; and supporting the first and second rails outside the tower with a first support frame. In one embodiment, positioning the first end of the first and second rails inside the tower may include coupling the first end of the first and second rails to an inner wall of the tower. This may be done, for example, using a second support frame, which may, in turn, be coupled to the inner wall of the tower. Additionally, the method may include adjusting the height of the first support frame. Furthermore, the method may include fixedly securing the first and second rails to at least one of the inner wall of the tower and the first support frame. In one embodiment, the transport system may include a plurality of transport segments and the method may include coupling the plurality of transport segments in an end-to-end fashion to form the transport system. The method may further include coupling adjacent segments in the region of the tower wall opening with frame spacers and rail segments.

The method may include activating a powered drive device to move the carriage along the track. In one embodiment, activating a powered drive device may include activating a winch system to move the carriage along the track. Still further, the method may include raising or lowering the wind turbine component by actuating an internal winch system in order to effectuate the raising or lowering of the wind turbine component.

A transport system for moving a wind turbine component into or out of a wind turbine having a tower with a door for closing off an opening through the tower comprises a track having a first end configured to be coupled to an inner wall of the tower and a second end configured to be positioned outside of the tower such that the track extends through the opening in the tower; one or more support frames configured to support the track; and a carriage configured to be movably coupled to the track and further configured to receive the wind turbine component thereon for movement of the wind turbine component into or out of the wind turbine. The one or more support frames include a first support frame configured to support the rails outside of the tower, the first support frame having a pair of legs which are adjustable in height.

In another embodiment, a transport system for moving a wind turbine component into or out of a wind turbine having a tower with a door for closing off an opening through the tower comprises a track having a first end configured to be positioned inside the tower and a second end configured to be positioned outside of the tower such that the track extends through the opening in the tower; one or more support frames configured to support the track; and a carriage configured to be movably coupled to the track and further configured to receive the wind turbine component thereon for movement of the wind turbine component into or out of the wind turbine, wherein the transport system includes a plurality of transport segments which are configured to be coupled in an end-to-end fashion to form the transport system. In this embodiment, each transport segment has a truss-like arrangement with a base support frame, a plurality of cross support frames configured to be coupled to an adjacent base support frame, and a pair of rail segments. The transport system may include a frame spacer and a rail spacer configured to extend between two adjacent transport segments and through the opening in the tower.

In these embodiments, the track includes first and second rails arranged in parallel relationship to each other. The transport system may further include a powered drive device configured to move the carriage along the track. In one embodiment, the powered drive device may include a winch system. Furthermore, the transport system may include an internal winch system configured to be coupled to the tower for moving the wind turbine component in a generally vertical direction.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

Figure 1:
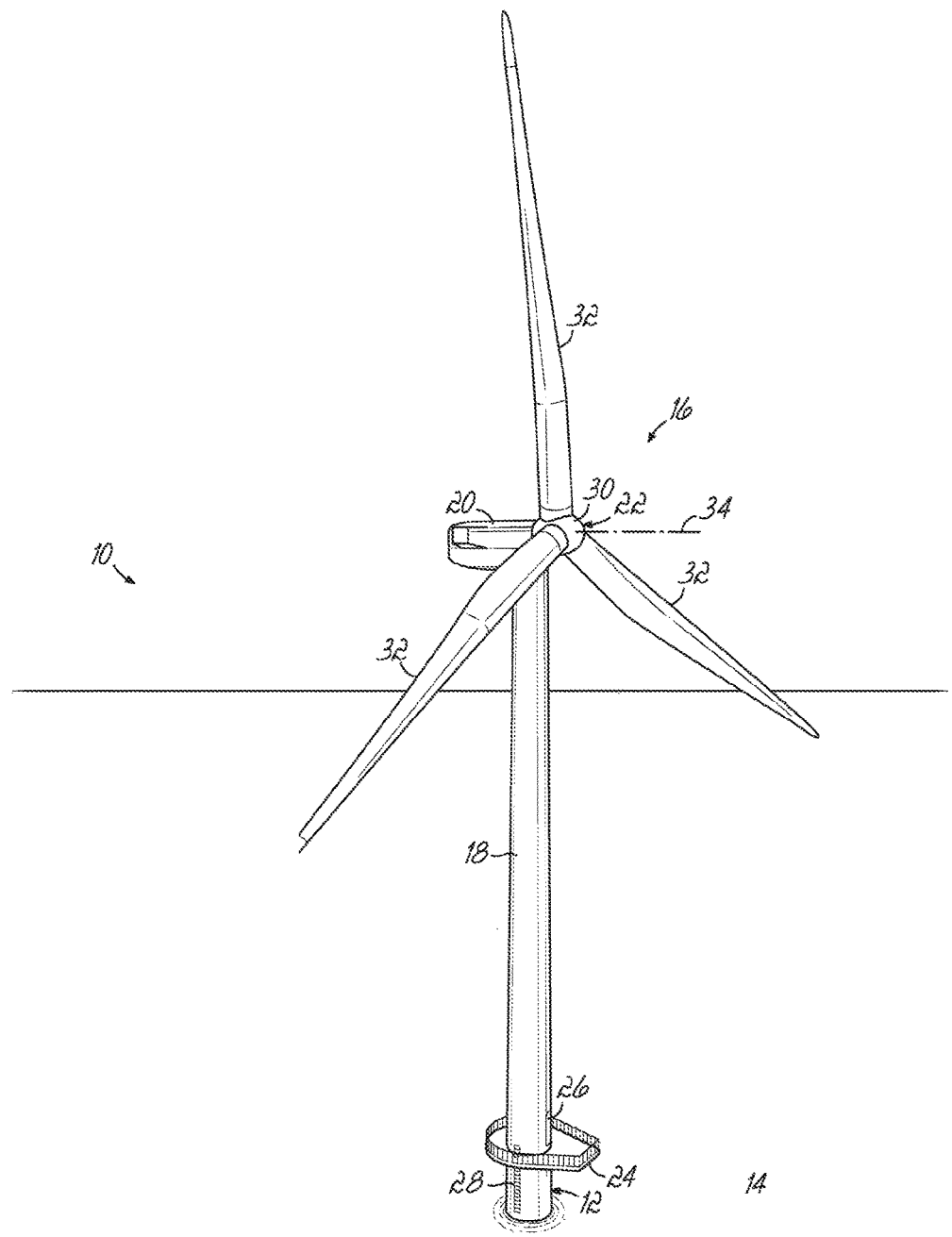
FIG. 1 is a perspective view of a wind turbine in accordance with an embodiment of the invention.

With reference to FIG. 1, an offshore wind turbine installation 10 includes a foundation 12 generally disposed in a body of water 14 and a wind turbine 16 fixedly secured to the foundation 12. A number of foundation designs may be used to support the wind turbine 16 including, for example, a monopile or truss foundation supported by the sea bed, and various floating foundation designs. The wind turbine 16 includes a tower 18, a nacelle 20 disposed at the apex of the tower 18, and a rotor 22 operatively coupled to a generator (not shown) housed inside the nacelle 20. The tower 18 supports the load presented by the nacelle 20, the rotor 22, and other components of the wind turbine 16 that are housed inside the nacelle 20 and also operates to elevate the nacelle 20 and rotor 22 to a height above sea level at which faster moving air currents of lower turbulence are typically found. As is typical of offshore installations, the wind turbine 16 includes an exterior platform 24 and a hatch or door 26 at the base of the tower 18 for allowing personnel, tooling, equipment, etc. to access the interior of the tower 18. In this regard, for example, a ladder 28 may extend downwardly from the platform 24 to allow personnel in a boat or other sea vessel to access the platform 24.

The rotor 22 of the wind turbine 16, which is represented as a horizontal-axis wind turbine, serves as the prime mover for the electromechanical system. Wind exceeding a minimum level will activate the rotor 22 and cause rotation in a plane substantially perpendicular to the wind direction. The rotor 22 of wind turbine 16 includes a central hub 30 and at least one blade 32 that projects outwardly from the central hub 30 at locations circumferentially distributed thereabout. In the representative embodiment, the rotor 22 includes three blades 32, but the number may vary. The blades 32 are configured to interact with the passing air flow to produce lift that causes the central hub 30 to spin about a longitudinal axis 34.

The wind turbine 16 may be included among a collection of similar wind turbines belonging to an offshore wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. In this regard, the wind turbine 16 may include various electrical components, such as transformers, converters, etc., that facilitate supplying electrical power generated by the generator to the power grid.

Figure 2:
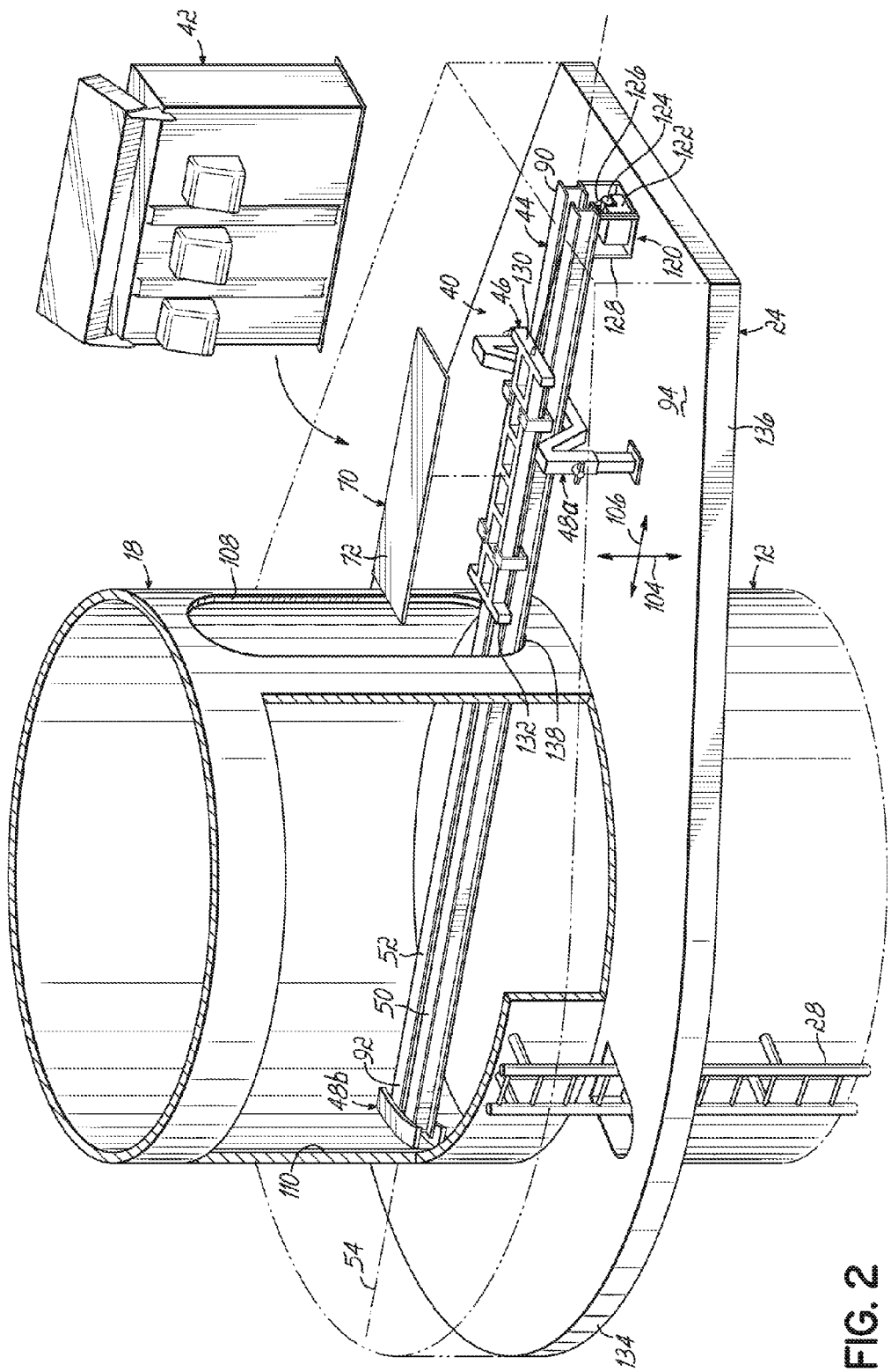
FIG. 2 is a perspective view of a transport system in accordance with one embodiment of the invention.

As noted above, during the working life of wind turbine 16 it may be necessary to remove various wind turbine components from the wind turbine 16 and replace the component with a new or refurbished component. In this regard, FIG. 2 illustrates an exemplary embodiment of a transport system, generally shown at 40, for moving a wind turbine component 42 out of the wind turbine 16, such as during a removal procedure, and/or moving a wind turbine component into the wind turbine 16, such as during an installation or replacement procedure. In an exemplary embodiment, the transport system 40 is configured to be used to move wind turbine components to/from the wind turbine tower 18 via the door 26 at the base of the tower 18. More particularly, the transport system 40 is configured to allow wind turbine components to be moved into and/or out of the wind turbine tower 18 via the door 26 in a relatively easy, time efficient, and cost efficient manner that obviates the need for large, complex, and expensive cranes (internal or external). Moreover, in an exemplary embodiment, the wind turbine component 42 being moved by transport system 40 is described herein as an electrical transformer.

However, the invention is not so limited, as the particular wind turbine component to be used in conjunction with the transport system 40 may vary depending on the specific application or need of the wind turbine owner.

Figure 3:
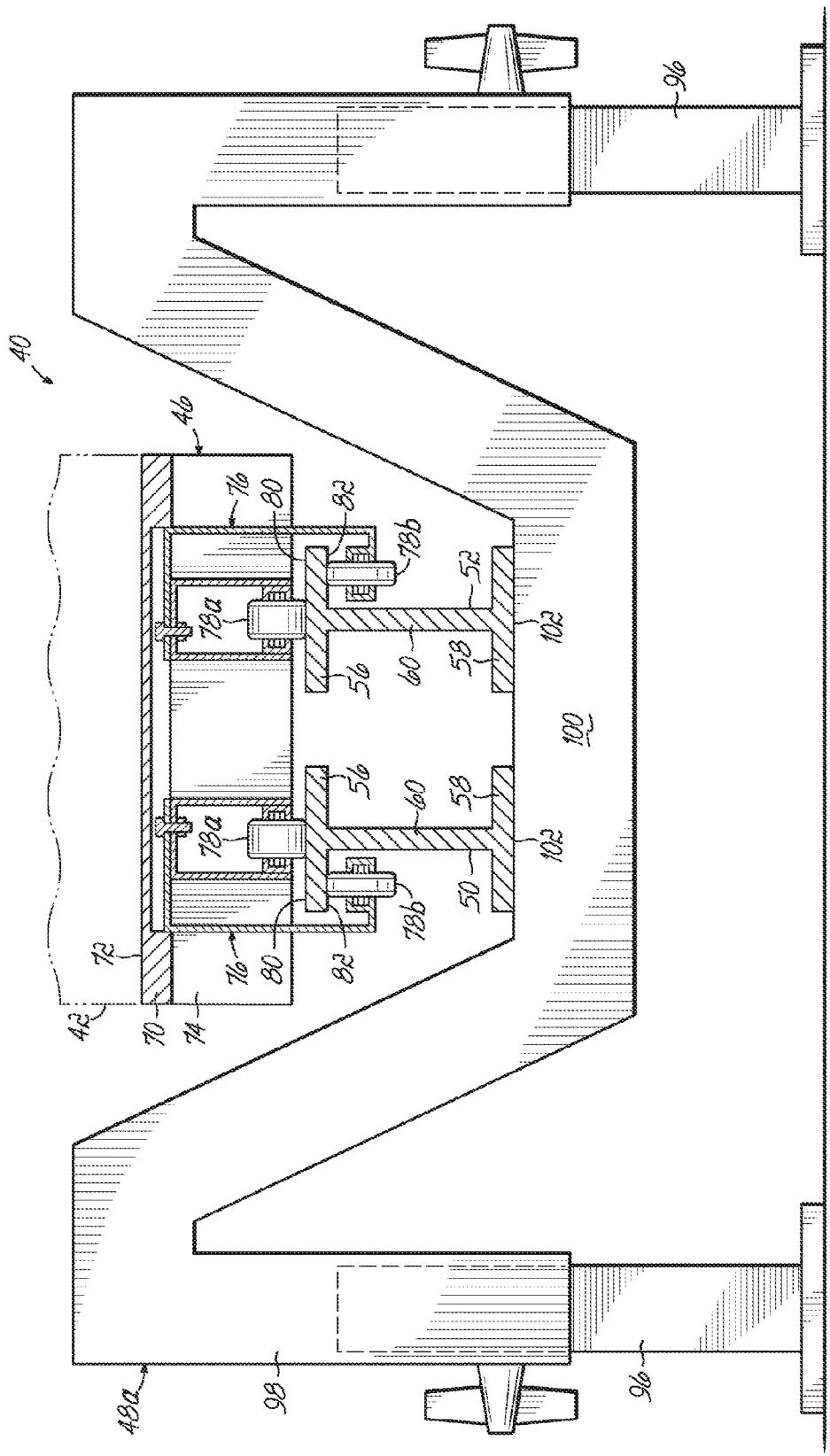
FIG. 3 is a cross-sectional view of the transport system shown in FIG. 2.

As illustrated in FIGS. 2 and 3, in one embodiment, the transport system 40 includes a track 44, a carriage 46 movably coupled to the track 44, and one or more support frames 48a, 48b for supporting the track 44 relative to the wind turbine 16. In one embodiment, the track 44 includes a pair of spaced apart, generally parallel rails 50, 52 which generally define a longitudinal axis 54. Each rail 50, 52 is substantially the same and in an exemplary embodiment, may be configured as an I-beam having an upper plate member 56, a lower plate member 58, and a generally centrally located intermediate web 60 connecting the upper and lower plate members 56, 68. The rails 50, 52 may be made out of steel or other suitable materials sufficient to handle the loads being imposed thereon during use of the transport system 40. Additionally, in one embodiment, each of the rails 50, 52 may be unitary or monolithic structures, and therefore be substantially continuous in the longitudinal direction. In an alternative embodiment, however, each of the rails 50, 52 may have a modular design comprising a plurality of rail segments (not shown) coupled in an end-to-end fashion to collectively form the rails 50, 52. This may allow the transport system 40 to be more easily stored at the wind turbine site or stowed on board a seafaring vessel that provides maintenance to the wind turbine 16.

The carriage 46 is configured to be movably coupled to the track 44 and further configured to receive the wind turbine component 42 thereon so as to be movable along the track 44. In this regard, the carriage 46 includes a generally rectangular, planar carriage platform 70 configured to receive the wind turbine component 42 on an upper surface 72 thereof, and a coupling member 74 coupled to the carriage platform 70 and further configured to be coupled to the track 44. The carriage platform 70 may be a generally solid member or alternatively, a lattice of several structural frame members. As illustrated in FIG. 3, the coupling member 74 may include a plurality of roller units 76 having a hub coupled to the carriage platform 70 and further including one or more wheels or rollers 78a, 78b for movably supporting the carriage platform 70 on the rails 50, 52. As illustrated in FIG. 3, for example, each roller unit 76 may include a first roller 78a engaging the upper surface 80 of the upper plate member 56 and a second roller 78b engaging or nearly engaging the lower surface 82 of the upper plate member 56. In the embodiment shown in FIG. 3, the second roller 78b is on the outside of the intermediate web 60. In an alternative embodiment, the second roller 78b may engage the lower surface 82 of the upper plate member 56 on the inside of the intermediate web 60 (not shown). In either embodiment, however, the second roller 78b helps stabilize the carriage 46 on the track 44 and substantially prevents the carriage 46 from being moved vertically off of the track 44.

Figure 4:
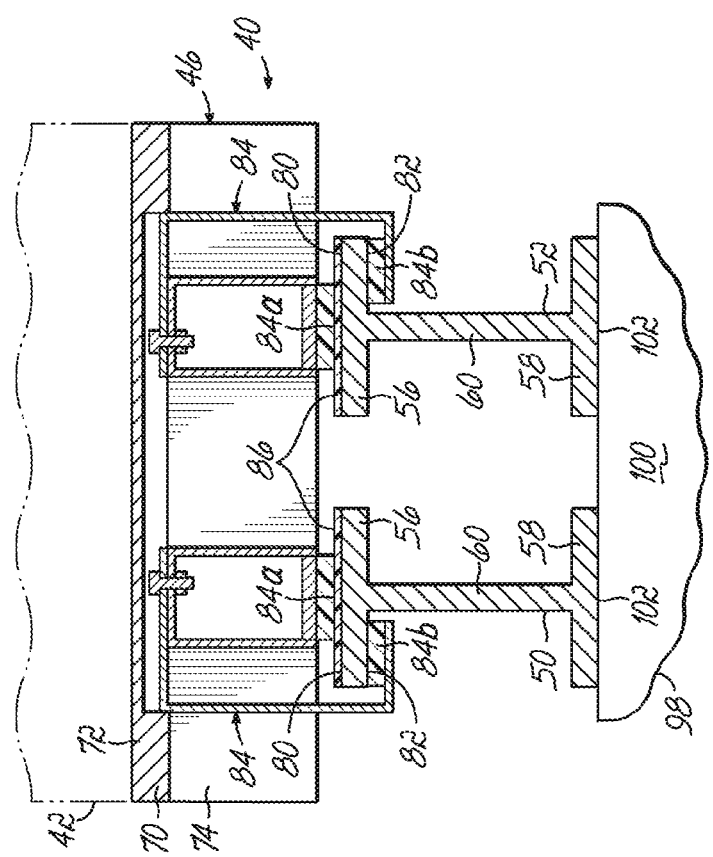
FIG. 4 is a cross-sectional view of a transport system in accordance with another embodiment of the invention.

While the embodiment shown in FIG. 3 illustrates the coupling member 74 as comprising roller units 76, other arrangements of the coupling member 74 are possible. For example, as illustrated in FIG. 4, the coupling member 74 may include a plurality of bearing pad units 84 having, for example, low friction characteristics bearing pads 84a, 84b so as to facilitate sliding movement of the carriage 46 along the track 44. In another embodiment, the rails 50, 52 may also include bearing pad units 86 configured to engage bearing pad units 84 on the carriage 46 and thereby further reduce the frictional movement of the carriage 46 along the track 44.

As illustrated in FIGS. 2 and 3, the transport system 40 further includes one or more support frames 48a, 48b for supporting the track 44, as well as the carriage 46 and wind turbine component 42 during, for example, use of the transport system 40. In this regard and in an exemplary embodiment, transport system 40 includes a first support frame 48a adjacent a first end 90 of the track 44 and a second support frame 48b adjacent a second end 92 of the track 44. As can be seen in FIG. 2, during use of the transport system 40, the first end 90 is positioned outside of the wind turbine tower 18 and the first support frame 48a engages an upper surface 94 of the platform 24 to support the track 44. In one embodiment, the first support frame 48a includes a pair of spaced apart legs 96 connected by an intermediate frame member 98. The intermediate frame member 98 includes a central section 100 configured to engage and support the rails 50, 52, such as at a lower surface 102 of the lower plate members 58. The first support frame 48a may be made from steel or other suitable materials sufficient to handle the loads being imposed thereon through use of the transport system 40.

In one embodiment and as illustrated in FIG. 3, the first support frame 48a may have an adjustable height so as to raise or lower the track 44 relative to the platform 24 in order to meet the needs of a specific application. For example, the height of the first support frame 48a may be configured such that the track 44 is substantially horizontal and generally parallel to the platform 24. Alternatively, the first support frame 48a may be configured such that the track 44 is angled upwardly or downwardly. By way of example, the track 44 may be angled depending on whether the wind turbine component 42 is being moved out of the wind turbine tower 18 or being moved into the wind turbine tower 18. In this regard, each of the legs 96 may move within a housing or shroud and include one or more locking pins that engage corresponding bores in the legs and housing to lock the relative position of the legs 96 (not shown). The bores are configured such that different bores provide a different height of the first support frame 48a. Alternatively, each leg 96 may include an actuator, such as a hydraulic actuator (not shown), for extending or retracting the legs 96 in order to provide a desired height. The ability to vary the height of the first support frame 48a is illustrated by arrow 104 in FIG. 2.

Additionally, the position of the first support frame 48a in the longitudinal direction defined by axis 54 may also be varied. This may vary, for example, based on the size or weight of the wind turbine component 42 being moved out of or into the wind turbine tower 18. The final positioning of the wind turbine component 42 on the transport system 40, from which the component would be removed therefrom, might also affect the position of the first support frame 48a. The ability to vary the longitudinal position of the first support frame 48a is illustrated by arrow 106 in FIG. 2.

In one embodiment, the rails 50, 52 may simply abut, but not be fixedly coupled to, the first support frame 48a at, for example, intermediate frame 98. This is illustrated, for example, in FIG. 4. Alternatively, however, the rails 50, 52 may be fixedly coupled to the first support frame 48a, such as with a suitable fastener or the like.

As can be further seen in FIGS. 2 and 5A-5F, during use, the transport system 40 extends through an opening 108 in the tower wall normally closed off by door 26 such that the second end 92 of the track 44 is disposed inside of the wind turbine tower 18. In one embodiment, the second support frame 48b may include a bracket configured to couple the transport system 40 to an inner wall or surface 110 of the tower 18, which, for example, may be generally opposite to opening 108. In this way, a portion of the track 44 spans an inner cross dimension (e.g., diameter) of the tower 18, for purposes that will be discussed in more detail below. By way of example, the second support frame 48b may be fixed, such as through welding, bolting, magnets, etc., to the inner surface 110 of the tower 18 and configured to couple to the track 44. In one embodiment, rails 50, 52 may abut the second support frame 48b to support the track 44. In another embodiment, however, the rails 50, 52 may be fixedly coupled to the second support frame 48b to prevent undesired movement of the rails 50, 52 away from the tower wall. By way of example, the rails 50, 52 may be coupled to the second support frame 48b using nuts and bolts, various locking pins, or other fasteners.

In an exemplary embodiment, the transport system 40 may further include a powered drive device 120 for moving the carriage 46 along the track 44 in a preferred direction, such as along longitudinal axis 54. As illustrated in FIG. 2, in one embodiment, the powered drive device 120 may include a winch system 122 comprising one or more rotatable drums 124 having a cable 126 wrapped thereabout. The drum 124 may be operatively coupled to a motor, such as an electric motor or hydraulic motor, for rotating the drum 124 in a certain direction to pay out or pay in the cable 126. In one embodiment, the winch system 122 may include a cage or housing 128, which may, in turn, be coupled to the track 44 adjacent the first end 90. The cable 126 may be coupled to the carriage 46 such that activation of the winch system 122 causes the carriage 46 to move along the track 44 in a desired direction. For example, to move the carriage 46 in a direction from the second end 92 toward the first end 90 (e.g., from inside the tower to outside the tower), the cable 126 may be coupled to a first end 130 of the carriage 46. To move the carriage 46 in a direction from the first end 90 toward the second end 92 (e.g., from outside the tower to inside the tower), the cable 126 may be coupled to a second end 132 of the carriage 46. In this regard, the second end 92 of the track 44 may include a pulley or the like (not shown) through which the cable 126 is threaded such that tensioning of the cable 126 (e.g., retraction) causes the desired movement in the carriage 46. Alternatively, the second end 92 of the track 44 may include another winch system (not shown) which may be coupled to the second end 132 of the carriage 46.

It should be recognized that embodiments of the invention are not limited to the powered drive device 120 described above, but include various alternative powered drive arrangements. By way of example, the carriage 46 may include a powered drive device for propelling the carriage 46 along track 44. This may include, for example, operatively coupling one or more of the rollers 78a, 78b to a motor or the like that drives the carriage 46 along the track 44. Furthermore, the carriage 46 may include a driven gear or the like that engages with a toothed rack on the track such that rotation of the gear moves the carriage 46 along the track 44. Those of ordinary skill in the art may recognize other powered drive devices for moving the carriage 46 along the track 44 in a controllable manner that remain within the scope of the present invention.

Use of the transport system 40 will now be described in reference to FIGS. 5A-5F. When it is desired to remove or replace a wind turbine component 42 of the offshore wind turbine 16, a seafaring vessel 112 (shown schematically) will be dispatched to facilitate the removal or replacement. Once on site of the wind turbine installation 10, personnel will gain access to the platform 24 and open the door 26 at the base of the tower 18. In this regard, the door 26 may be hinged and simply rotated to an open position to provide opening 108 through the tower wall. Alternatively, the door 26 may be completely removed from the tower 18. Still further, the door 26 and the frame that supports the door 26 may be removed from the tower so as to maximize the opening 108 through the tower wall. Personnel may also place the first support frame 48a on the platform 24 at the desired or predetermined location. In this regard, a crane 114 on board the vessel 112 (also shown schematically) may be used to move the first support frame 48a to its desired or predetermined location. Prior to or subsequent to placing the first support frame 48a on the platform 24, the height of the legs 96 may be appropriately adjusted to meet the specific application. Moreover, if the second support frame 48b is not already attached to the inner wall 110 of the tower 18 (i.e., as part of the tower installation), it may be so positioned.

With the opening 108 in the tower wall now accessible, the first support frame 48a positioned on the platform 24, and the second support frame 48b coupled to the inner wall 110 of the tower 18, the rails 50, 52 may be off-loaded from the vessel 112. In this regard, the crane 114 on board the vessel 112 may raise a rail, say rail 50, and position it relative to the wind turbine 16 such that the second end 92 thereof extends through the opening 108 and into the interior of the tower 18. The rail 50 is of an extent that the first end 90 is outside of the tower 18. In this regard, the platform 24 may be sized such that a portion of the platform 24 underlies the first end 90 of the rail 50. For example, typical offshore platforms are generally annular structures positioned about the tower 18 and adjacent door 26. In the embodiment shown herein, the platform 24 includes an annular portion 134 and an extension portion 136 that extends outwardly from the annular portion 134 in a region adjacent the door 26. The extension portion 136 provides increased space in the region of the door 26 to allow the wind turbine component 42 to be completely positioned outside of the tower 18 and removed from the wind turbine 16, as will be described below.

While still being supported by the crane 114, rail 50 may be positioned so as to be coupled to the second support frame 48b on the inner surface 110 of the tower 18. Once coupled at its second end 92, the rail 50 may be lowered so as to engage the first support frame 48a on the platform 24. If necessary, the height of the first support frame 48a may be varied. Once finally positioned, rail 50 may be released from the crane 114 and, depending on the particular embodiment, may be fixedly secured to the first support frame 48a. The same process may then be used to position the second rail 52 relative to the wind turbine 16 and relative to the first rail 50 so as to form track 44. In one embodiment, the rails 50, 52 may be configured to engage the edge 138 of the opening 108 in the tower wall to further support the track 44. In an alternative embodiment, however, the rails 50, 52 may be configured to be spaced from the edge 138 of the opening 108. In a still further embodiment, a third support frame may be placed immediately adjacent the opening 108 or on the edge itself to further support the track 44 and protect the tower wall in the region adjacent edge 138.

To further assemble the transport system 40, the carriage 46 may be placed relative to the rails 50, 52. For example, the carriage 46 may be threaded over the first end 90 of the rails 50, 52 such that the rollers 78a, 78b or the bearing pads 84a, 84b, as illustrated in FIGS. 3 and 4, respectively, and described above, engage the rails 50, 52. Thus, the carriage 46 is coupled to the rails 50, 52 and movable therealong in directions generally parallel to the longitudinal axis 54. The powered drive device 120 may then be coupled to the transport system 40 (if, for example, not already integrated into the carriage). Depending on the particular embodiment, as discussed above, this may entail coupling the winch housing 128 to one or both of the rails 50, 52 adjacent the first end 90. Additionally, the end of cable 126 may be coupled to the carriage 46 to facilitate movement of the carriage 46.

As an alternative to the above, much of the transport system 40 may be pre-assembled before being lifted onto the platform 24, such as on vessel 112. In this regard, the carriage 46 and the winch housing 128 may be coupled to the rails 50, 52 to form an assembly which is then lifted onto the platform 24 using crane 114. To position the transport system 40 relative to the tower 18 (i.e., the first end positioned inside the tower), the winch system 122 at the first end 90 or another winch system (not shown) adjacent second end 92 may be used. More particularly, the cable from the winch system may be coupled to the inner wall 110, such as at second support frame 48*b* using a hook or the like, and the winch activated so as to effectively pull or drag the rails 50, 52 into the tower 18 (e.g., in the generally horizontal direction). The first ends 90 of the rails 50, 52 may then be coupled to the inner wall 110 of the tower 18, as discussed above. Those of ordinary skill in the art may recognize additional or alternative combinations for assembling the transport system 40 and positioning the transport system 40 relative to the wind turbine 16.

Figure 5A:
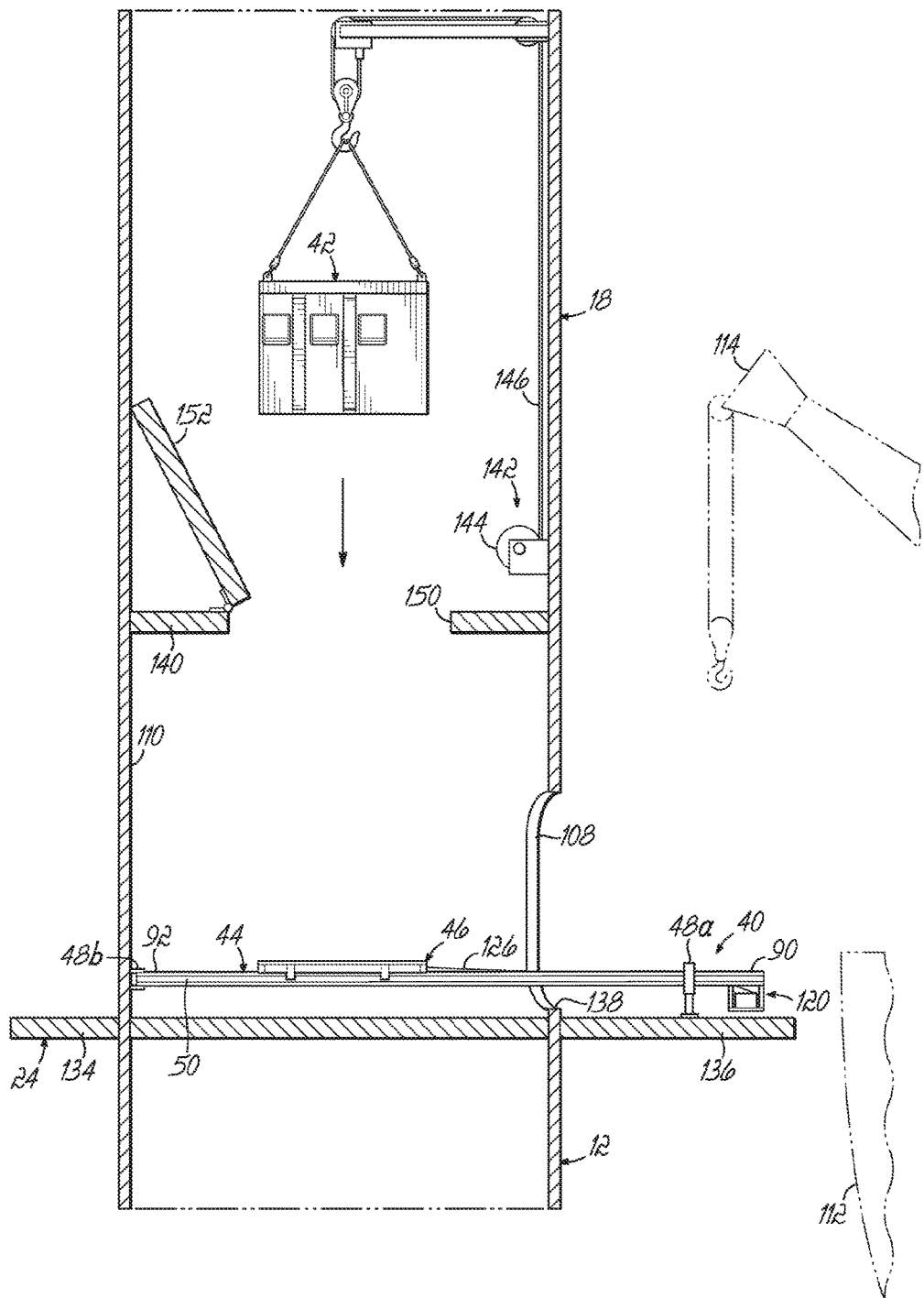
FIGS. 5A-5F illustrate removal and replacement of a wind turbine component in accordance with an embodiment of the invention.

As illustrated in FIG. 5A, for a removal procedure, the carriage 46 may be initially positioned in the interior of the tower 18. As illustrated, the wind turbine component 42, which may be an electrical transformer, is disposed on a platform 140 generally positioned above the door opening 108 within tower 18. Thus, to remove the transformer 42, the wind turbine 16 may include an internal winch system 142 comprising at least one rotatable drum 144 and a cable 146 wrapped thereabout. The drum 144 may be operatively coupled to a motor for rotating the drum and paying out or paying in the cable 146 as is understood in the art. The winch system 142 may be supported in the tower 18 by a support beam coupled to the inner wall 110 of the tower 18. Unlike many internal crane systems, the winch system 142 is configured to move a load (e.g., a wind turbine component) in only one direction, i.e., the vertical direction. Accordingly, the winch system 142 is significantly less complex and less costly as compared to current internal crane systems.

Figure 5B:
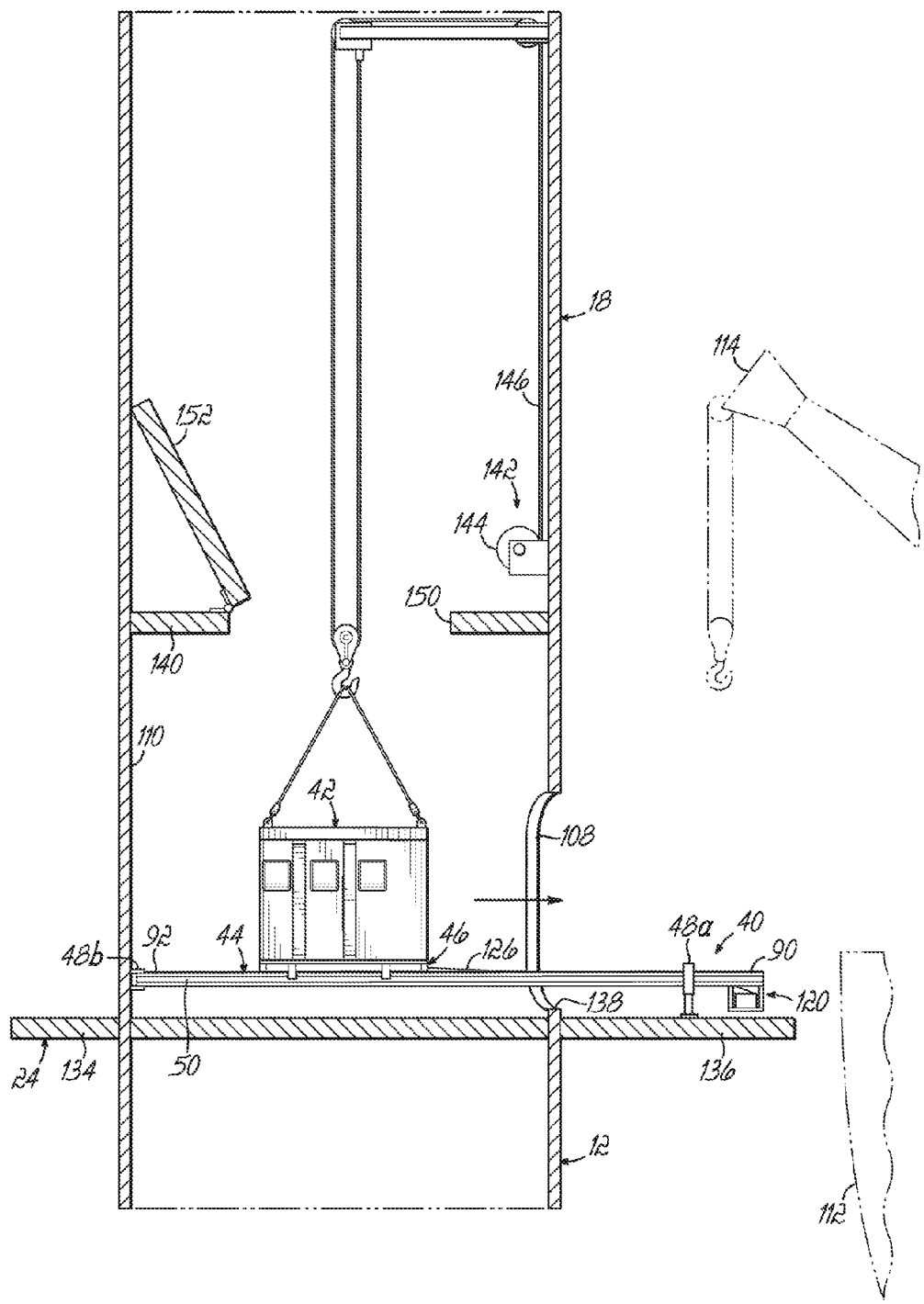

The end of the cable 146 may be coupled to the transformer 42 and the winch system 142 activated so as to lift the transformer 42 off the platform 140. With the transformer 42 lifted off the platform 140, at least part of the platform 24 may be moved to provide an opening 150 that allows the transformer 42 to pass the platform 24 and access to the region under the platform 140, including opening 108 in the tower wall. For example, the opening 150 in platform 140 may be formed by sliding, hinging, or removing a closure 152, such as a panel, door, hatch, etc. The size of the opening 150 (and thus closure 152) must be such that the transformer 42 may pass therethrough. Those of ordinary skill in the art may recognize other ways to move or arrange the platform to allow the transformer 42 to pass. With the closure 152 in the open position, the winch system 142 may be activated so as to lower the transformer 42 through opening 150 and on to the carriage 48 positioned so as to be in alignment with opening 150, as illustrated in FIG. 5B.

With the transformer 42 positioned on the carriage 48, the cable 146 of winch system 142 may be disengaged from the transformer 42.

Figure 5C:
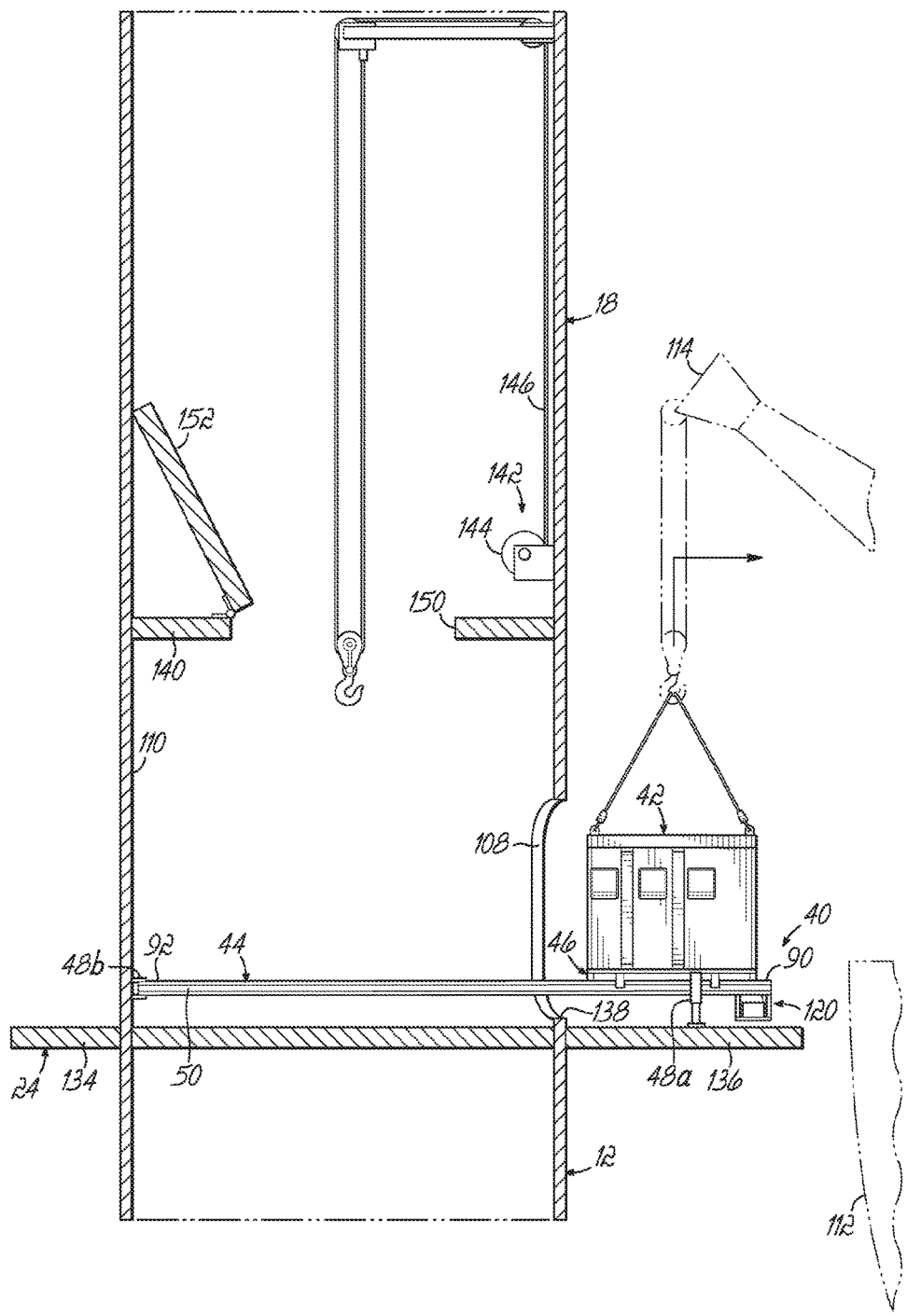

Next, the winch system 122 may be activated such that the carriage 46 carrying the transformer 42 moves along the track 44 from inside the tower 18 toward the first end 90 of the track 44 outside of the tower 18 and through opening 108 in the tower wall. This is illustrated in FIG. 5C. As noted above, the track 44 and platform 24 are configured such that the transformer 42 may be completely positioned outside of the tower 18. With the transformer 42 positioned completely outside of the tower 18, the crane 114 on the vessel 112 may be used to lift the transformer 42 off the carriage 46 and away from the wind turbine 16.

Figure 5D:
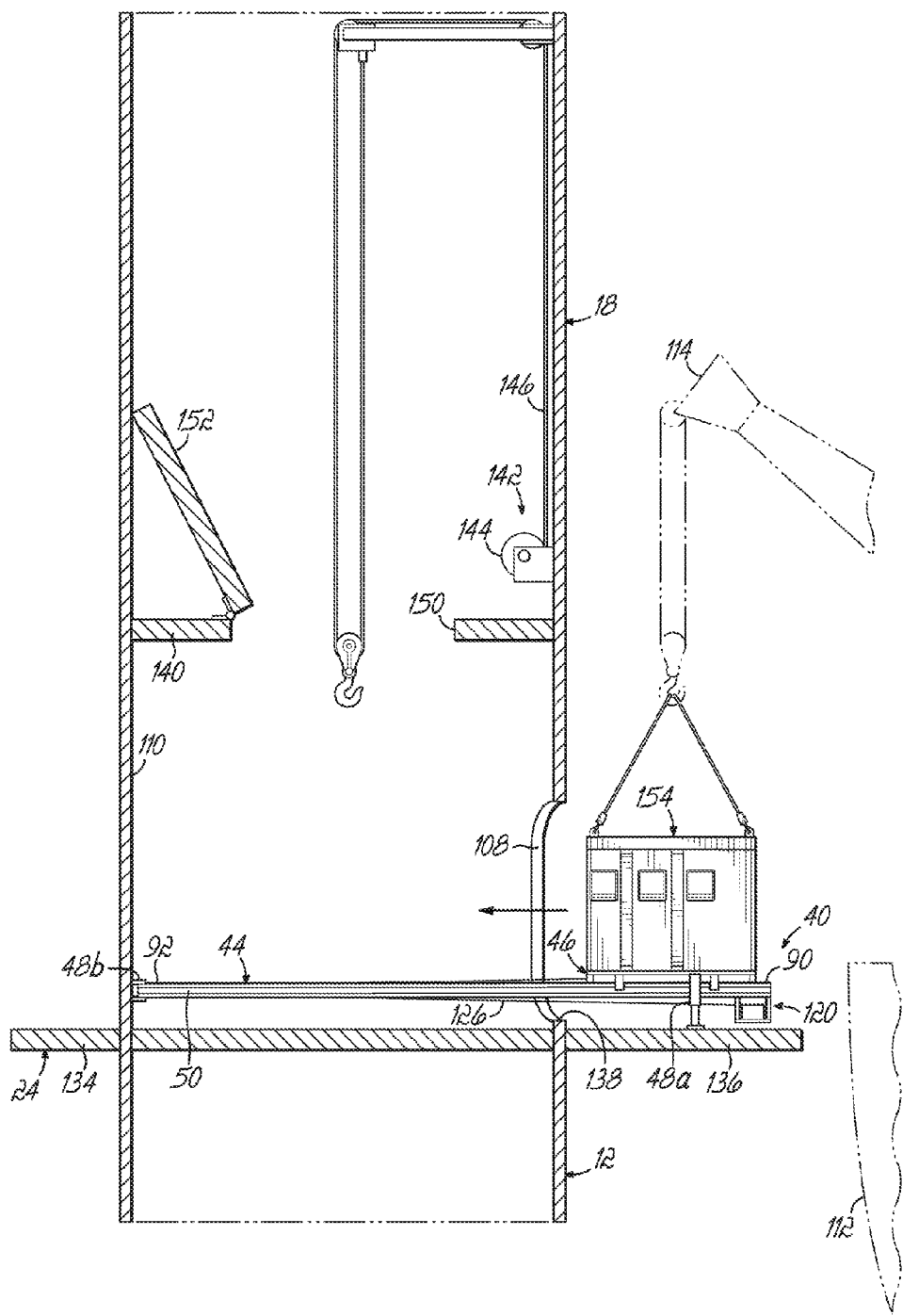

Another wind turbine component 154, such as a replacement transformer, may be carried by the vessel 112 and may be coupled to the vessel crane 114 and lifted up to the platform 24. More specifically and as illustrated in FIG. 5D, the vessel crane 114 may be used to place the replacement transformer 154 on the carriage 46, which is positioned outside of the tower 18. Either prior to or subsequent to the replacement transformer 154 being positioned on the carriage 46, the cable 126 of the winch system 122 may be coupled to the carriage 46 such that activation of the winch system 122 causes the carriage 46 to move from outside the tower to inside the tower. As noted above, this may include threading the cable 126 about a pulley adjacent the second end 92 of the track 44. Alternatively, a winch system adjacent second end 92 may be used (not shown). The winch system 122 may be activated such that the carriage 46 carrying the replacement transformer 154 moves along track 44 from outside the tower 18 toward the second end 92 of the track 44 inside the tower 18 and through opening 108 in the tower wall. The carriage 46 may be positioned so as to generally align with opening 150 in platform 140.

Figure 5E:
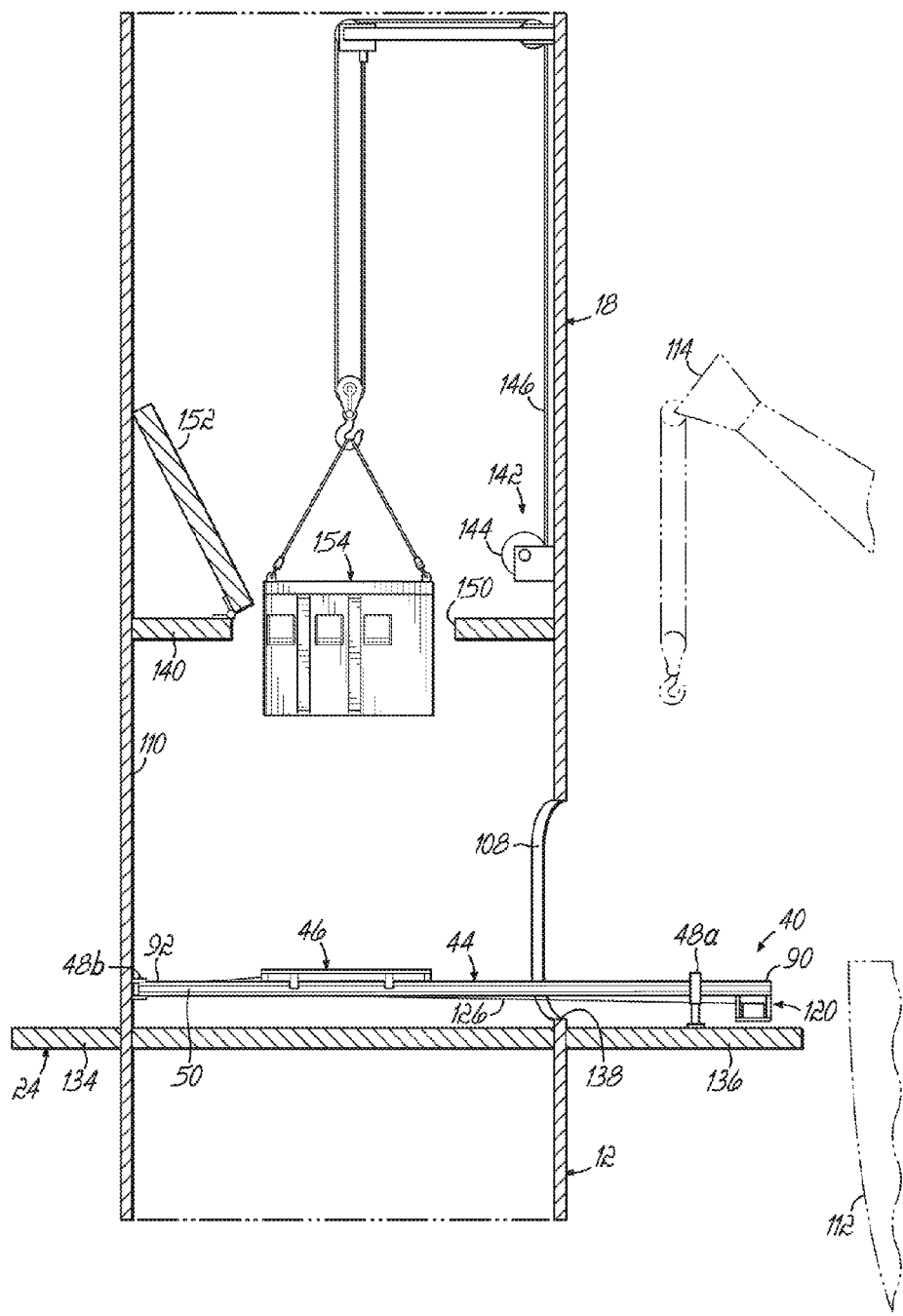
Figure 5F:
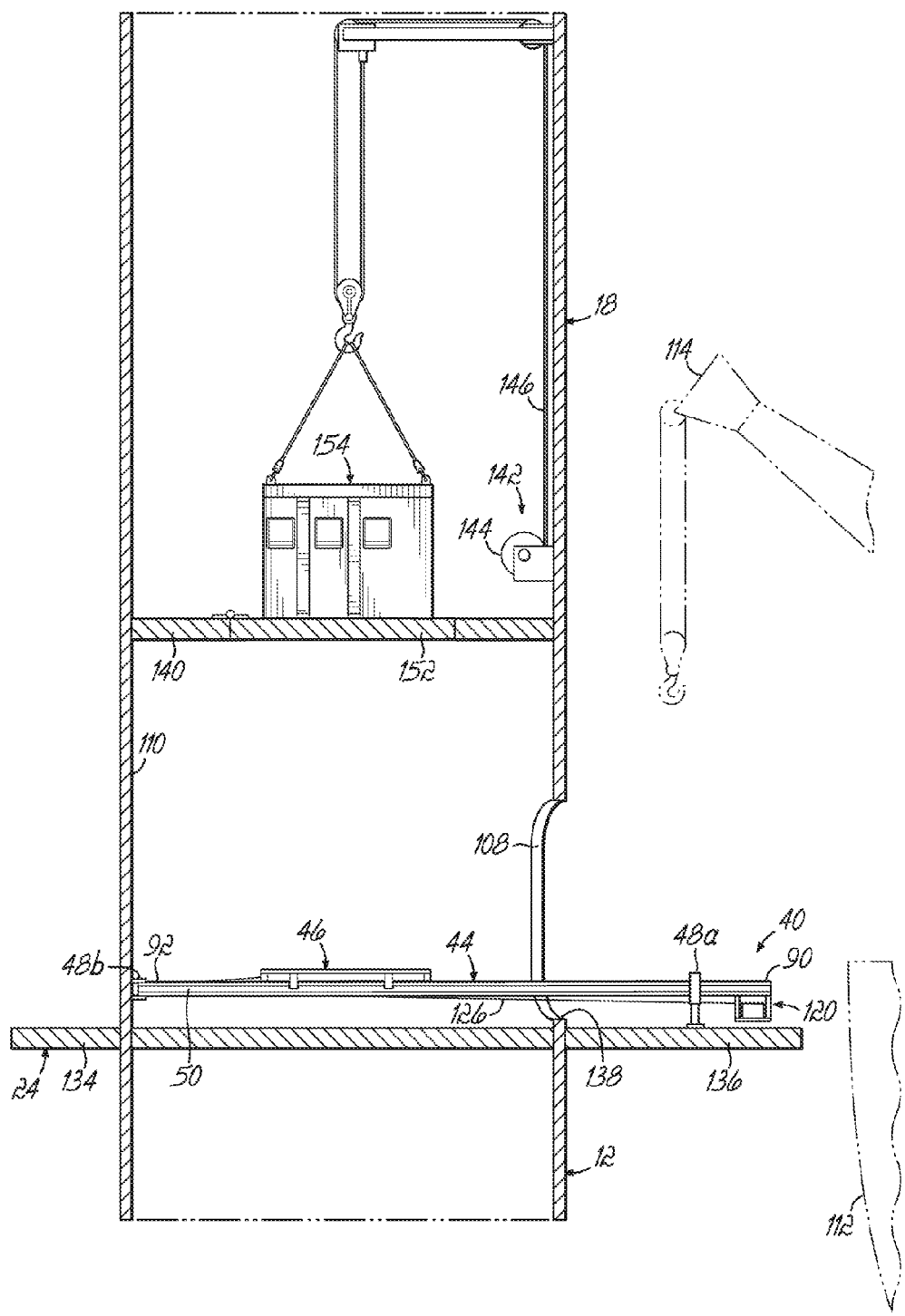

From here and illustrated in FIG. 5E, the end of cable 146 of internal winch system 142 may be coupled to the replacement transformer 154 and the winch system 142 activated so as to lift the replacement transformer 154 vertically off of the carriage 46 and through the opening 150 in platform 140 so that the replacement transformer 154 is above the platform 140. Next, as illustrated in FIG. 5F, the closure 152 may be moved back to its closed position over opening 150 and the internal winch system 142 activated so as to lower the replacement transformer 154 onto the platform 140. The cable 146 may then be disengaged from replacement transformer 154. Once physically positioned, various personnel may then take the necessary steps to integrate the replacement transformer 154 into operation with wind turbine 16. As that process forms no part of the present invention, it will not be described in any further detail herein.

With the old transformer 42 being removed and replacement transformer 154 positioned within wind turbine 16, the transport system 40 may be disassembled. In this regard, the cable 126 of winch system 122 may be disengaged from the carriage and the winch housing 128 may be removed from the rails 50, 52. The carriage 46 may then be removed from the track 44, such as at first end 90. Next, the rails 50, 52 may be uncoupled from the first and second support frames 48*a*, 48*b* and removed from the wind turbine 16 using the vessel crane 114. The first support frame 48*a* may then be removed from the platform 24 by crane 114. If the second support frame 48*b* is removable from the inner wall 110 of the tower 18, it may also be removed from the platform 24. If the second support frame 48*b* is not intended to be removed, then it is left in place on the inner wall 110 of the tower 18 to be used at a later date. Alternatively, and similar to the above, the rails 50, 52, carriage 46, and powered drive device 120 may be removed as an assembly using crane 114, for example.

Figure 6:
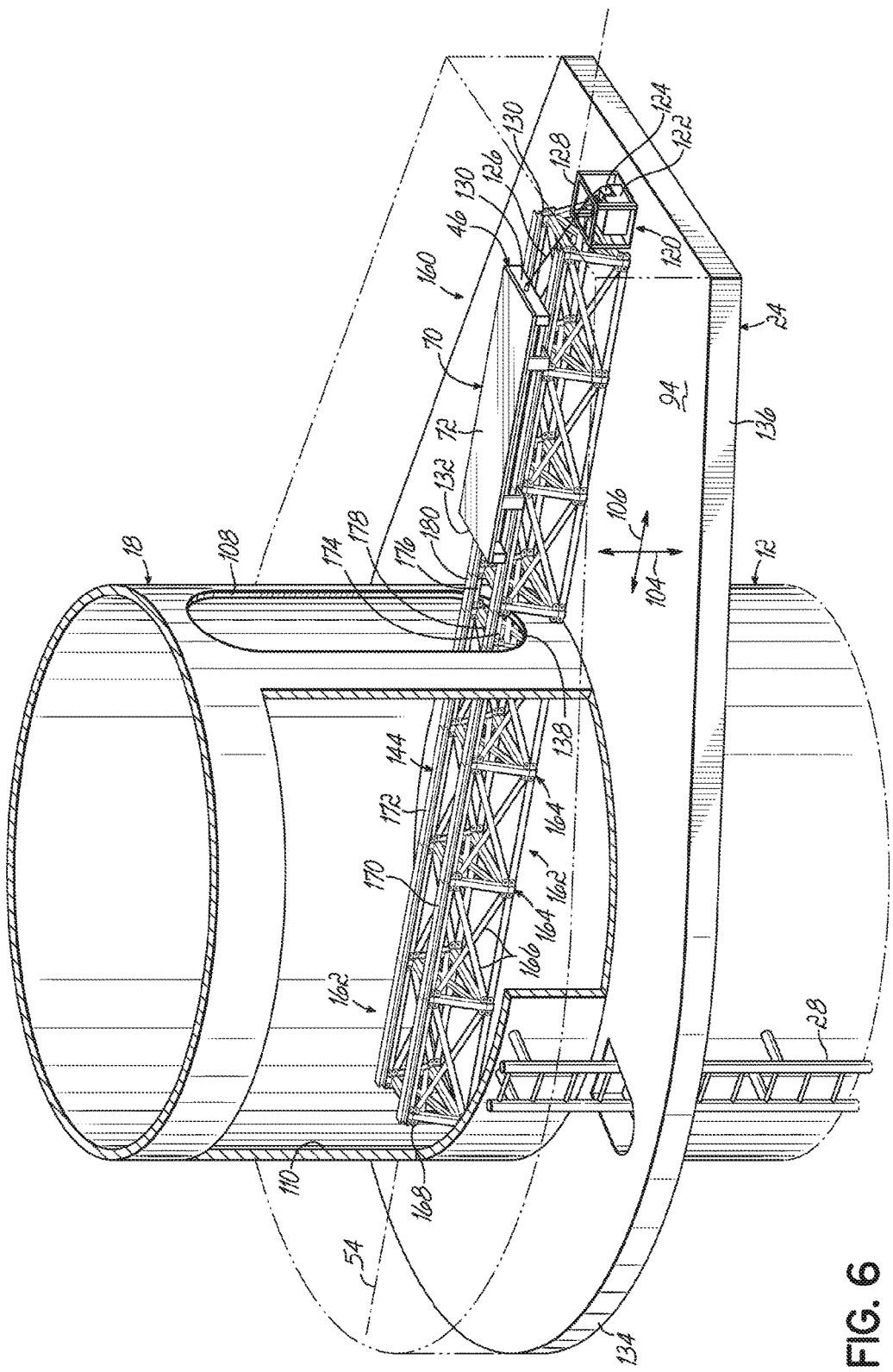
FIG. 6 is a perspective view of a transport system in accordance with another embodiment of the invention.

FIG. 6 illustrates a transport system 160 in accordance with an alternative embodiment. Transport system 160 operates in a manner similar to transport system 40, thus only the primary differences between the two embodiments will be discussed in detail. One of ordinary skill in the art will readily understand the structure and operation of transport system 160 based on the description given below and that provided above. In this regard, one difference between the two transport systems is that transport system 160 has a modular design, whereas transport system 40 is primarily intended to have a unitary or monolithic design. Another difference in the two transport systems is that transport system 160 includes a truss design for supporting the track of the transport system 160.

More particularly, the transport system 160 includes a plurality of transport segments 162 which are coupled together in an end-to-end fashion to collectively form the transport system 160. By forming the transport system 160 in segments, it is intended to be more easily manipulated by workers at the wind turbine installation 10 during, for example, assembly and disassembly. Each transport segment 162 includes a base support frame 164 and a plurality of cross support frames 166 configured to couple the base support frame 164 to an adjacent base support frame 164. In one embodiment, the cross support frames 166 may include both straight members (e.g., at the upper and lower ends) and x-members (in between the straight members). A host of other arrangements may also be possible. The base support frame 164 may include a plurality of tabs 168 to facilitate coupling of the cross support frames 166 thereto. The tabs 168 may also be used to couple the transport system 160 to the inner wall 110 of the tower 18 at its second end 92.

Each transport segment 162 also includes a pair of spaced apart, generally parallel rail segments 170, 172 positioned at the upper end of the base support frame 164. Thus, when the transport segments 162 are coupled together, the rail segments 170, 172 collectively form the track 44. The rail segments 170, 172 may also be configured as I-beams, as described above. Accordingly, the rail segments 170, 172 may be configured to cooperate with carriage 46 in the same manner as that described above. The transport system 160 may also include a powered drive device, such as those shown and/or described above, to move the carriage 46 along the track 44.

In the region of the opening 108 through the tower wall, transport system 160 may include frame spacers 174, 176 extending between two adjacent base support frames 164 and through opening 108. In this regard, the frame spacers 174, 176 may couple to adjacent base support frames 164 near their upper ends and above the edge 138 of the tower wall. This region may also include rail spacers 178, 180 likewise extending between two adjacent base support frames 164 in order to complete the track 44. The use of frame and rail spacers allows transport system 160 to be used with different size towers. The use of transport system 160 is similar to that described above and no further explanation is deemed necessary to understand aspects of the invention using this embodiment.

While the present invention has been illustrated by a description of various preferred embodiments and while these embodiments have been described in some detail, it is not the intention of the inventors to restrict or in any way limit the scope of the appended claims to such detail. Additional advantages and modifications will readily appear to those skilled in the art. For example, while the transport systems above have been described for use with offshore wind turbine installations, the transport systems may also be used for onshore wind turbine installations as well. In this regard, the foundation or ground surrounding the wind turbine tower may serve the same function as the platform as described above. Thus, the various features of the invention may be used alone or in any combination depending on the needs and preferences of the user.

What is claimed is:

1. A method of removing a wind turbine component from a wind turbine having a tower with a door for closing off an opening through the tower, the method comprising:
    providing a transport system comprising a track having a first end and a second end, one or more support frames configured to support the track and a carriage configured to be movably coupled to the track;
    assembling the transport system, including positioning the first end inside the tower and positioning the second end outside of the tower such that the track extends through the opening in the tower;
    raising the wind turbine component off a section of a platform located within the tower and above the door;
    moving at least a part of the section of the platform to allow the wind turbine component to pass the platform;
    lowering the wind turbine component onto the carriage;
    moving the carriage along the track from inside the tower to outside the tower such that the wind turbine component is completely positioned outside the tower; and
    removing the wind turbine component from the carriage.

2. The method according to claim 1, further comprising moving another wind turbine component into the wind turbine, comprising:
    positioning the another wind turbine component on the carriage;
    moving the carriage along the track from outside the tower to inside the tower;
    raising the another wind turbine component off of the carriage and above the platform;
    moving at least a part of the platform to prevent the another wind turbine component from passing the platform;
    lowering the another wind turbine component onto the platform; and
    disassembling the transport system.

3. The method according to claim 1, wherein assembling the transport system further comprises:
    positioning a first end of a first rail inside the tower with a second end positioned outside the tower;
    positioning a first end of a second rail inside the tower with a second end positioned outside the tower, the second rail being positioned so as to be generally parallel to the first rail; and
    supporting the first and second rails outside the tower with a first support frame.

4. The method according to claim 3, wherein positioning the first end of the first and second rails inside the tower further comprises coupling the first end of the first and second rails to an inner wall of the tower.

5. The method according to claim 4, further comprising fixedly securing the first and second rails to at least one of the inner wall of the tower and the first support frame.

6. The method according to claim 4, wherein positioning the first end of the first and second rails inside the tower further comprises coupling the first end of the first and second rails to the inner wall of the tower at or near locations along the inner wall opposite the opening.

7. The method according to claim 3, further comprising adjusting the height of the first support frame.

8. The method according to claim 7, wherein adjusting the height of the first support frame causes the first and second rails to be angled relative to horizontal.

9. The method according to claim 1, wherein assembling the transport system further comprises coupling a plurality of transport segments in end-to-end fashion to form the transport system.

10. The method according to claim 9, further comprising coupling adjacent transport segments in the region of the tower wall opening with frame spacers and rail spacers.

11. The method according to claim 1, wherein moving the carriage along the track further comprises activating a powered drive device that moves the carriage along the track.

12. The method according to claim 11, wherein activating a powered drive device further comprises activating a winch system that moves the carriage along the track.

13. The method according to claim 1, wherein raising or lowering the wind turbine component further comprises actuating an internal winch system to raise or lower the wind turbine component.

14. The method according to claim 1, wherein raising the wind turbine component off of the platform includes raising the wind turbine component along a vertical axis, and wherein lowering the wind turbine component onto the carriage includes lowering the wind turbine component along the vertical axis.

15. The method according to claim 1, wherein raising the wind turbine component off of the platform includes raising the wind turbine component off of the at least part of the platform prior to moving the at least part of the platform to allow the wind turbine component to pass the platform.

16. A method of removing a wind turbine component from a wind turbine tower having an internal platform including a closure for closing off an opening through the platform, the method comprising:
- coupling a cable of a hoist system to the wind turbine component when the wind turbine component is supported by the closure;
- supporting the wind turbine component via the hoist system;
- moving at least a portion of the closure to allow the wind turbine component to pass the platform; and
- lowering the wind turbine component through the opening along a vertical axis via the hoist system.

\* \* \* \* \*